W. L. BLISS.
SYSTEM OF ELECTRICAL REGULATION.
APPLICATION FILED MAR. 14, 1907. RENEWED JULY 31, 1916.
1,197,175.
Patented Sept. 5, 1916.
2 SHEETS—SHEET 1.
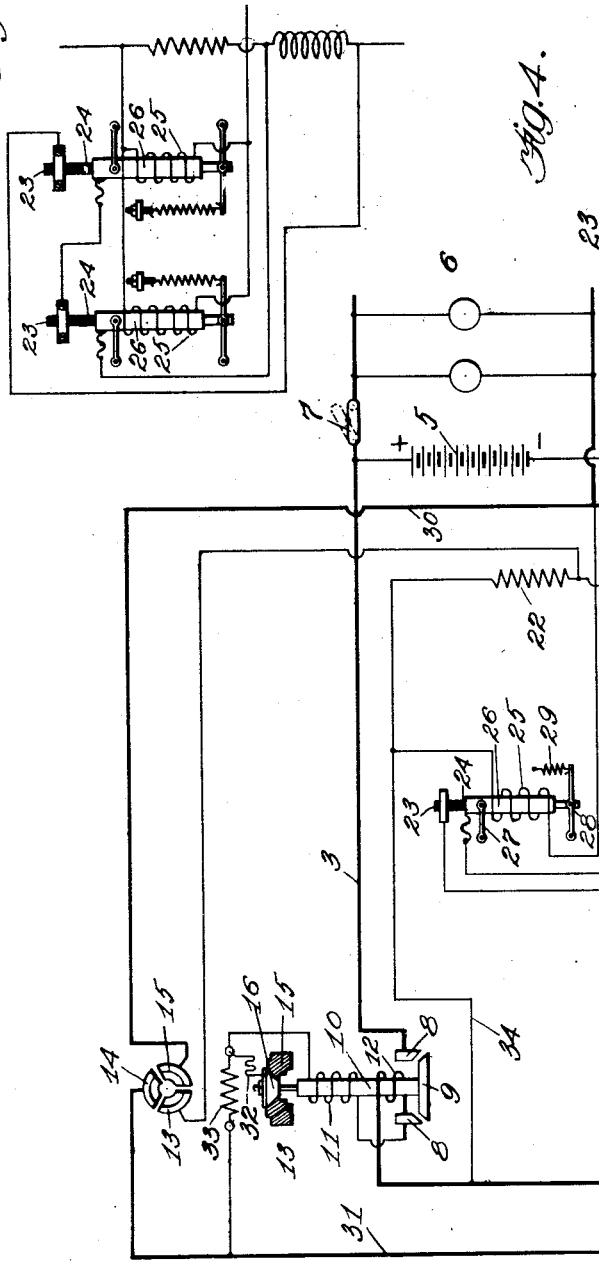
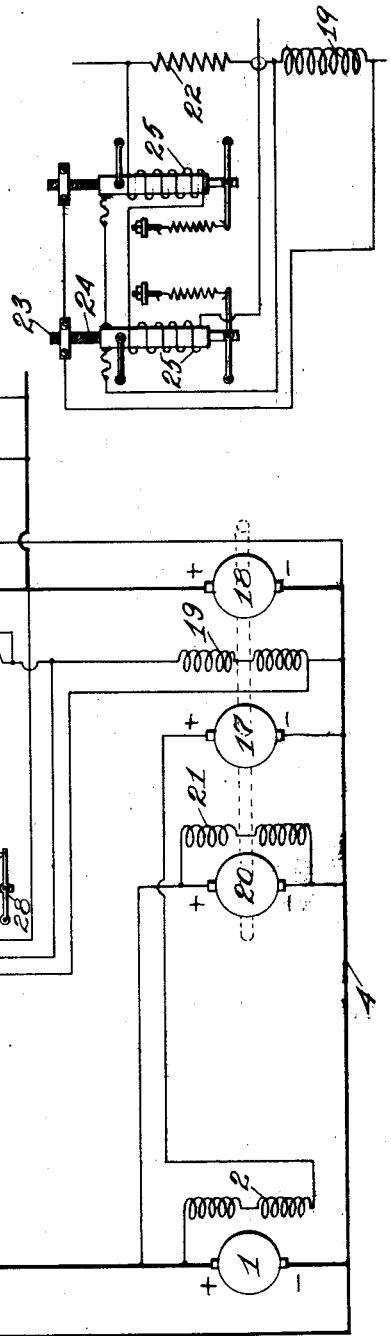

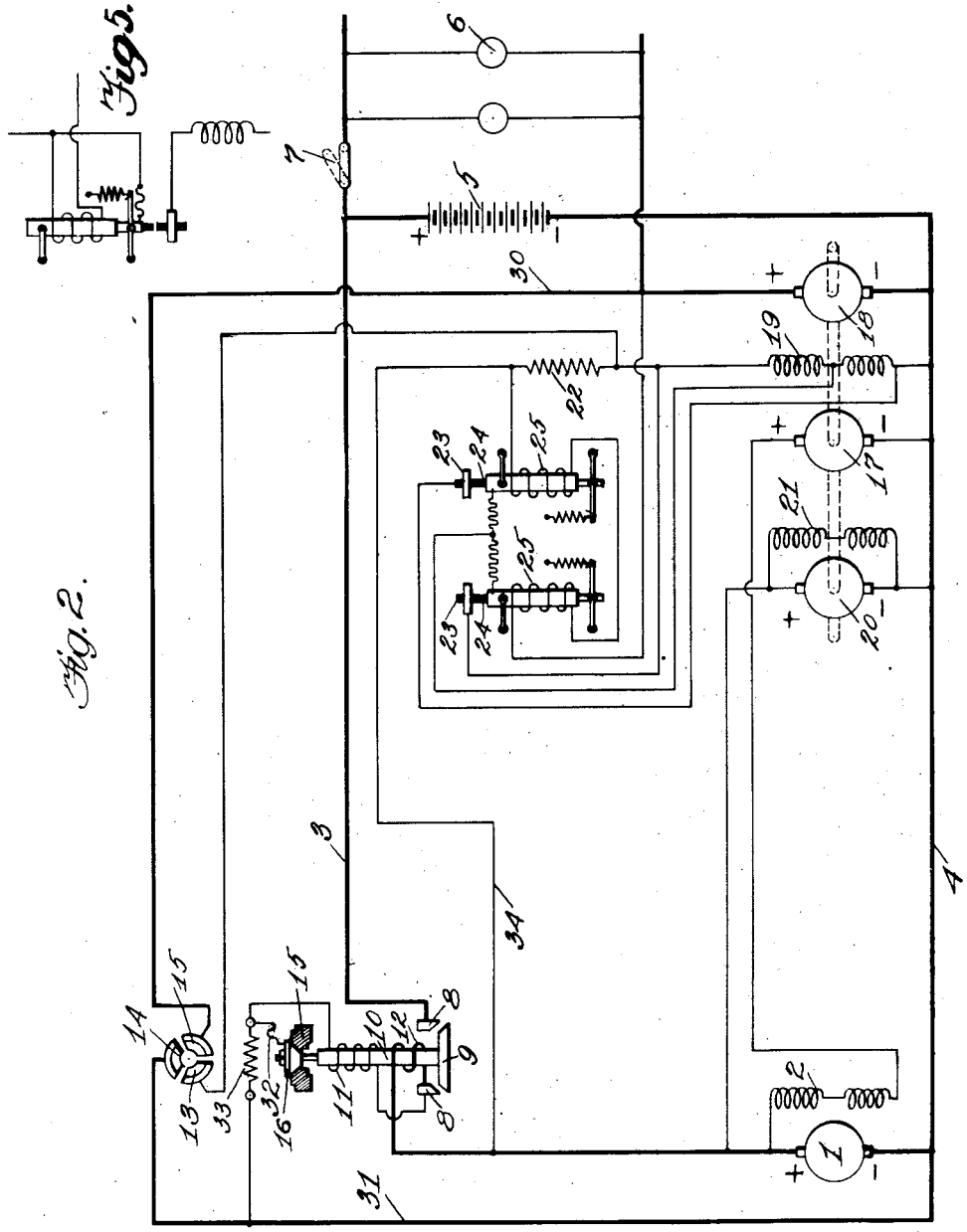
W. L. BLISS.
SYSTEM OF ELECTRICAL REGULATION.
APPLICATION FILED MAR. 14, 1907. RENEWED JULY 31, 1916.
1,197,175. Patented Sept. 5, 1916.
2 SHEETS—SHEET 2.
WITNESSES:
Robert H. Weir
Herbert J. Smith
INVENTOR
William L. Bliss
BY
Edwin B. H. Tower
ATTORNEY

UNITED STATES PATENT OFFICE.

WILLIAM L. BLISS, OF BROOKLYN, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL REGULATION.

1,197,175.     Specification of Letters Patent.     Patented Sept. 5, 1916.

Application filed March 14, 1907, Serial No. 362,376. Renewed July 31, 1916. Serial No. 112,457.

*To all whom it may concern:*

Be it known that I, WILLIAM L. BLISS, a citizen of the United States, residing at Brooklyn, in the county of Kings and State of New York, have invented new and useful Improvements in Systems of Electrical Regulation, of which the following is a full, clear, concise, and exact description, reference being had to the accompanying drawing, forming a part of this specification.

My invention relates to improvements in systems of electrical regulation and it is particularly applicable to a system of electrical distribution wherein lamps or other translating devices and a storage battery are supplied with current by a generator, tending to develop a variable voltage, as for instance, in an electrical car lighting system in which the generator is driven by a car axle.

The object of my invention is to provide regulating means whereby the voltage impressed upon the lamps will be kept practically constant, and the voltage developed by the generator will be confined within predetermined limits.

In practising my invention as a whole, I employ two regulators, one for regulating the generator and the other for regulating the voltage impressed on the lamps, and I directly control the action of these regulators by auxiliary regulating means.

The regulators which I preferably employ in practice are counter electromotive force devices, known in the art as "buckers". One bucker serves to regulate the field strength of the generator and is known as the field bucker and the other serves to regulate the voltage impressed upon the lamps and is known as the lamp bucker. The action of these buckers is directly controlled by the winding that excites the field thereof and this winding is known as the controlling winding.

According to the preferred form of my invention, the strength of the controlling winding is controlled by an auxiliary regulator, the action of which is controlled by a winding that is responsive to the voltage impressed upon the lamps.

In order to more particularly explain the nature of my invention, I have diagrammatically illustrated the features thereof in the accompanying drawings in which—

Figure 1 shows a system in which a single auxiliary regulator is used, Fig. 2 shows a system having a double auxiliary regulator, Figs. 3 and 4 show different forms of the auxiliary regulators, and Fig. 5 is another modification of the auxiliary regulator.

In explaining my invention in detail I shall consider that it is applied to a car lighting system. It will, of course, be understood that the features of my invention are applicable to various forms of systems and that various modifications may be made in the systems that I shall particularly describe for the purpose of explaining all the characteristics of my invention.

I preferably employ a shunt wound generator having an armature 1 and shunt field winding 2. Suitable means are provided for driving the generator from a car axle. From the generator extends a main circuit having conductors 3 and 4. Two parallel branch circuits are connected to the main circuit, one the battery circuit, including the storage battery 5, and the other the lamp circuit including the lamps 6. The lamp circuit may be provided with a hand switch 7.

The main circuit is preferably provided with an automatic switch having stationary contacts 8—8 and a movable contact 9. The movable contact is carried by the plunger 10 of a solenoid having a shunt winding 11 and a series winding 12. A short-circuiting switch, the purpose of which will be hereinafter explained, is associated with the automatic switch. It consists of triple contacts 13, 14, and 15, forming a socket and a movable plug or contact 16 adapted to fit within said socket and connect the triple contacts. The plug 16 is mounted upon the plunger 10 so that when the automatic switch is opened, the short-circuiting switch will be closed and vice versa. In order to clearly illustrate the short-circuiting switch and its electrical connections, I have shown a section view above which there is a plan view of the triple contacts. Of course the switches that I have just described may assume different forms from that which I have illustrated.

The buckers which are employed to regulate the generator and the lamp voltage each consist of an armature and a field. The field bucker is provided with an armature 17 which is connected in the shunt field circuit of the generator and the lamp bucker is provided with an armature 18 which is connected in the lamp circuit. The field of these buckers is excited by a winding 19 which is called herein the controlling winding. The armatures of the buckers are connected to the armature 20 of a shunt wound motor having a field winding 21. In practice the field bucker, the lamp bucker, and the motor are preferably combined into a unitary structure. It will be noted, however, that each of these devices may be made a separate entity.

The controlling winding is connected in a shunt circuit upon which the full voltage developed by the generator is impressed. This shunt circuit includes a resistance arranged in series with the controlling winding so as to prevent a short-circuit across the main circuit when the controlling winding is short-circuited by the auxiliary regulator which will be hereinafter explained. The strength of the controlling winding is controlled by an auxiliary regulator having a pair of electrodes 23 and 24 connected in a non-inductive circuit to short-circuit the controlling winding when the same are in contact. The electrode 23 is stationary and the one 24 is movable. The movable electrode is adapted to be withdrawn from the stationary electrode by means of a solenoid or winding 25 which is connected across the lamp circuit so as to be subjected to the same voltage as the lamps. The movable contact is mounted upon the plunger 26 of the solenoid 25. The plunger is preferably suspended upon pivoted links 27 and 28, each link being pivoted at one end to a support and at the opposite end to the plunger. The link 28 is attached to a spring 29 which urges the movable electrode to remain in contact with the stationary electrode. The drawing illustrates the auxiliary regulator in a very simple form. Of course, this regulator may assume various different forms in practice.

In order to explain the action of the auxiliary regulators and the buckers, I shall now describe the operation of my system. It may be assumed that the normal voltage of the storage battery is about 64 volts, and that lamps adapted for a corresponding voltage are used. It may be further assumed that the generator is adapted to produce 64 volts when the train runs at about 20 miles per hour. The automatic switch is adapted to close when the generator develops about 64 volts. When the automatic switch is opened, the generator is disconnected from the storage battery and the buckers are rendered inoperative by the short-circuiting switch. The short-circuiting switch completely short-circuits the lamp bucker, the contact 15 being connected to one terminal of the armature 18, the contact 13 being connected to one terminal of the controlling winding 19 and the contact 14 being connected to the other terminal of said winding and said armature, these connections being formed through suitable circuits. When the generator is inoperative, the storage battery furnishes current to operate the lamps and current flows from the positive terminal of the storage battery through switch 7, lamps 6, conductor 30, contact 15, plug 16, contact 14, conductor 31, and conductor 4 to the negative terminal of the battery.

I shall now describe the actions that take place when the generator commences to operate and its speed, and consequently its voltage increase. When the generator voltage reaches about 64 volts, the automatic switch will be closed by the shunt winding 11. The current for energizing said winding flows first through the series winding 12, contact 8, shunt winding 11, flexible connection 32, plug 16, contact 14, and conductor 31 to the negative terminal. As soon as the short-circuiting switch opens, a resistance 33 is placed in circuit with the shunt winding 11, thereby reducing the current flowing through said winding. After the automatic switch closes, the series winding 12 is energized by the current that flows across said switch to the battery and lamps, and then this winding assists the shunt winding in holding the movable contact 9 firmly in engagement with the stationary contacts. So long as the generator voltage and battery voltage are substantially equal, the storage battery and the generator conjointly furnish the current to operate the lamps. When the generator voltage rises above that of the storage battery, the generator carries the entire lamp load and sends current through the battery circuit to charge the storage battery. Current then flows from the positive terminal of the generator, through switch contacts 8, 9, 8, and conductor 3 to the junction of the battery and the lamp circuits. At this point the current divides, part flowing through the lamp circuit and part through the battery, and then it reunites in conductor 4 and returns to the negative terminal of the generator.

When the generator commences to operate, it sends current through the motor, this motor being connected to the generator and, accordingly, the motor rotates the armatures 17 and 18. So long as the short-circuiting switch remains closed, the buckers are inoperative. When the short-circuiting switch is opened, however, the field bucker introduces a counter electromotive force into the field circuit and the lamp bucker introduces a counter electromotive force into the lamp circuit. The value of these counter electromotive forces is controlled by the auxiliary regulator in a manner that will be hereinafter explained.

When the buckers are in operation, the same really act as motors and absorb power from the line to operate themselves. The motor is then relieved of its load and is driven by the buckers and consequently acts as a generator and restores to the system a part of the energy that is consumed by the buckers. The buckers are kept running at practically constant speed by the load which is placed upon them by the motor.

The controlling winding 19 is energized by current which flows from the positive terminal of the generator, through conductor 34, resistance 22, winding 19, and conductor 4 back to the negative terminal of the generator.

While the generator voltage is below the normal lamp voltage, the electrodes of the auxiliary regulator are in contact, thereby short-circuiting the controlling winding 19. In consequence the buckers are quiescent. When the generator voltage rises above the normal lamp voltage, the solenoid 25 which is connected across the lamp circuit acts upon the auxiliary regulator, thereby causing the movable electrode 24 to vibrate and thus successively make and break the contact between the electrodes to open and close the short-circuit around the controlling winding 19. The result of this action of the auxiliary regulator is that the strength of the controlling winding 19 is so regulated as to cause the buckers to produce sufficient counter electromotive force to maintain the proper voltage upon the lamps and to keep the generator voltage within a predetermined limit. The lamp bucker introduces a counter electromotive force into the lamp circuit equal to the rise in the generator voltage above the normal lamp voltage, and the field bucker so regulates the generator that the generator voltage remains within a proper limit. In order for the generator to send current through the battery circuit to charge the battery, it is necessary for the generator voltage to rise above that of the battery. In practice under the conditions that have previously been specified, it is preferable to allow the generator voltage to rise to about 80 volts as that voltage is sufficient to send the full charging current through the storage battery, which has a normal voltage of about 64 volts. The field bucker introduces a counter electromotive force into the shunt field circuit of the generator in opposition to the current the generator tends to send through the shunt field winding. As the generator voltage tends to rise, the counter electromotive force produced by the field bucker increases. Accordingly the shunt field strength is varied inversely as the generator speed. The generator voltage is thus confined within predetermined limits. The field bucker is designed to so operate that the generator voltage will be confined within proper limits and still increase sufficiently to send current through the storage battery.

I shall now describe the cycles of operation of the auxiliary regulator and the buckers, as the generator voltage rises. Obviously, an increase in the generator voltage produces an increase in the voltage impressed upon the lamp circuit. When the voltage upon the lamp circuit increases, the solenoid 25 responds and separates the electrodes of the auxiliary regulator, thereby allowing the current in the controlling winding 19 to increase. As the strength of the controlling winding increases, the buckers increase their counter electromotive forces, and, accordingly, the generator voltage and the lamp voltage commence to subside. When the lamp voltage becomes normal again, the solenoid 25 allows the electrodes to come together. The controlling winding is then again short-circuited and the strength of the controlling winding commences to decrease. Accordingly the counter electromotive forces produced by the buckers commence to subside with the result that the generator voltage and the normal lamp voltage again commence to increase, thereby causing the cycle of operation of the auxiliary regulator and the buckers to be repeated.

While the generator voltage is above the normal lamp voltage, the cycles of operation of the auxiliary regulator and the buckers take place in rapid succession. In fact the time it takes for each cycle to occur is almost infinitesimal. Naturally there is a time lag in the magnetism of the controlling winding 19. Accordingly the controlling winding cannot gain its full strength the instant the short-circuit around it is removed, and likewise its strength cannot diminish instantly to a practically negligible amount when it is short-circuited. The electrodes vibrate so rapidly that the rise and fall in the strength of the controlling winding is hardly perceptible. The buckers respond almost instantaneously to the variations in strength of the controlling winding, and, accordingly the fluctuations in the generator voltage and the lamp voltage are practically reduced to a negligible degree.

As the generator speed, and, consequently, its voltage increases, the character of the vibration of the movable electrode varies, thereby allowing the controlling winding to maintain a greater degree of strength so that the buckers will produce greater counter electromotive forces, and thus maintain proper lamp and generator voltages. For instance, when the generator is tending to develop a high voltage, the movable contact will remain separated from the stationary contact a longer time than it would if the generator were tending to develop a lower voltage. It will be observed that when the short-circuit is opened, the strength of the controlling winding commences to increase. Before it increases very far, the short-circuit is closed again and then the strength of the controlling winding commences to decrease, and so on. As a slight variation in the strength of the controlling winding causes an almost instantaneous variation in the lamp voltage, and as a slight variation in lamp voltage causes the solenoid 25 to lift or release its core, the electrodes are caused to make and break contact in rapid succession. In consequence variations in the strength of the controlling winding are very slight while the generator speed remains constant.

Naturally for a given period, the controlling winding is in circuit for a certain part of the time and out of circuit for the remainder of the time, it being in and out of circuit in rapid succession. It is, therefore, obvious that if the time it is in circuit is increased, and the time it is out of circuit accordingly decreased, its strength will be increased. When the generator speed increases, the character of the excursions of the movable electrode in opening and closing the short-circuit is so varied that the time the controlling winding 19 is in circuit is increased, and accordingly the strength of the controlling winding is increased, thereby causing the buckers to produce greater counter electromotive forces. Therefore, as the speed of the generator increases, the field bucker reduces the field strength of the generator and the lamp bucker produces a greater drop in voltage in the lamp circuit, thereby keeping the generator voltage and also the lamp voltage properly regulated.

Inasmuch as the regulating electrodes are arranged in a non-inductive circuit the same are not subjected to an "inductive kick". In consequence, these electrodes are saved from excessive sparking. The fact will be noted that for a given speed of the generator, the voltage that is impressed upon the battery will be practically constant, notwithstanding the rise in the counter electromotive force of the battery as its charge increases. Accordingly a "tapered charge" will be produced, that is, the current that is sent through the battery will decrease as the charge in the battery increases.

Of course my invention may be carried out in various ways and its features may be applied in different relations. Furthermore one part of my system may be used without another where it may be deemed desirable to do so.

In practice the controlling winding usually consists of two coils and I therefore prefer to provide an auxiliary regulator for each coil, as illustrated in Fig. 2. Each auxiliary regulator is constructed in the same way as the one hereinbefore described. The stationary electrode of one regulator is connected to the outside terminal of one coil, and the stationary electrode of the other auxiliary regulator is connected to the outside terminal of the other coil, and the movable electrode of both regulators is connected to the inner terminal of each coil. The solenoids 25 of the two regulators may be connected in circuit in series with each other as shown, the two being arranged in a short-circuit extending across the lamp circuit. It will be understood, however, that these solenoids may be connected in circuit in any other suitable way so long as the proper results are obtained. In practice it is sometimes desirable to break up the sparking between the pair of electrodes of the auxiliary regulator. This may be done by providing the regulator with two or more pairs of separable electrodes as illustrated in Figs. 3 and 4. It is preferable to provide the movable electrode of each pair with its own operating solenoid. These solenoids may be connected in circuit in various ways in relation to each other. They may be connected in circuit in parallel with each other, as indicated in Fig. 3, or in series with each other, as indicated in Fig. 4. Furthermore the several pairs of electrodes may be connected in circuit in relation to each other in various ways. For instance, the same may be connected in series as illustrated in Fig. 3, or in parallel, as illustrated in Fig. 4.

In Fig. 5 I have illustrated the auxiliary regulator so modified that the spring 29 urges the movable electrode to separate from the stationary electrodes, and the solenoid 25 serves to bring the movable electrode into engagement with the stationary contacts. In this structure the electrodes are connected in circuit in series with the controlling winding 19. When the lamp voltage tends to rise, the electrodes make and break contact in the same way as hereinbefore described and thus undulate the current that is sent through the controlling winding 19, thereby causing the regulating effects that are desired. Of course various equivalent forms of the auxiliary regulator may be devised, all of which fall within the scope of my invention. Moreover, auxiliary regulators of a different character from that which I prefer to employ may be used.

While I have specified that the electrodes make and break contact, it will be understood that some forms of the auxiliary regulator may be so sensitive that a mere variation in the pressure between the electrodes is sufficient to cause enough variation in the strength of the controlling winding to effect proper regulation. In such a case the action would be equivalent to making and breaking the contact between the electrodes.

In a co-pending application, Ser. No. 381,745, filed July 1st, 1907, automatic electric regulator, I have described and claimed a different embodiment of the broad features of the present invention.

Having thus described my invention, what I claim as new and desire to secure by Letters Patent of the United States is:

1. A regulator for an electric circuit comprising a regulating device connected in said circuit having an electromagnetic winding connected across said circuit to control the action of said regulator and a voltage responsive vibrator provided with an operating winding for short-circuiting said electromagnetic winding, the operating winding of said vibrator being connected across said circuit between said regulating device and the load.

2. A regulator for an electric circuit comprising a counter-electromotive force device connected in said circuit, a field winding for said device connected across said circuit, a voltage responsive vibrator provided with an operating winding for short-circuiting said field, the operating winding of said vibrator being connected across said circuit between said counter-electromotive force device and the load.

3. A regulator for an electric circuit comprising a counter-electromotive force device connected in said circuit, a field winding for said device connected across said circuit, a voltage responsive vibrator provided with an operating winding for short-circuiting said field winding, the operating winding of said vibrator being connected across said circuit between said counter-electromotive force device and the load, and an automatic switch for rendering said counter-electromotive force device inoperative when the voltage of the source of supply is less than the predetermined value.

4. A regulator for an electric circuit including a counter-electromotive force device connected in said circuit, a field winding for said device connected across said circuit, a voltage responsive vibrator provided with an operating winding for short-circuiting said field winding, the operating winding of said vibrator being connected across said circuit between said counter-electromotive force device and the load, an automatic switch for rendering said counter-electromotive force device inoperative and for disconnecting said operating winding from the load when the voltage of the source of supply is less than the predetermined value.

5. A regulator for use in a system containing a variable speed generator to which a storage battery and lamps are connected in parallel, said regulator comprising a regulating device for regulating the field strength of the generator, a second regulator for connection between the storage battery and the lamps to regulate the voltage upon the lamp circuit, an electromagnetic winding for controlling the action of said regulators, a voltage responsive vibrator for short-circuiting said winding, the operating winding of said vibrator being connected across the lamp circuit between the storage battery and the lamps.

6. A regulator for an electrical system including a variable speed generator to which a storage battery and lamps are connected in parallel, said regulator comprising a counter-electromotive force device having two armatures and a common field winding, one armature for regulating the field strength of the generator and the other for connection between the storage battery and the lamps to regulate the voltage impressed upon the lamps, and a voltage responsive vibrator provided with an operating winding for short-circuiting said field winding, the operating winding of said vibrator being connected across the lamp circuit on the side of the armature away from said battery.

7. A regulator for an electrical system including a variable speed generator to which a storage battery and lamps are connected in parallel, said regulator comprising a counter-electromotive force device having two armatures and a common field winding, one armature for regulating the field strength of the generator and the other for connection between the storage battery and the lamps to regulate the voltage impressed upon the lamps, a voltage responsive vibrator provided with an operating winding for short-circuiting said field winding, the operating winding of said vibrator being connected across the lamp circuit on the side of the armature away from said battery, and an automatic regulator for rendering said counter-electromotive force device inoperative when the voltage of the generator falls to a predetermined value.

8. An automatic electric regulator, comprising a regulating device adapted for connection in the circuit to be regulated, said device being provided with an electromagnetic winding, a resistance in series with said winding, and a voltage responsive relay for intermittently short-circuiting said winding but not said resistance.

9. A regulator for electrical systems including a variable speed generator, said regulator comprising a counter-electromotive force device provided with a single field and two armature windings, one for regulating the field of the generator and the other for regulating voltage to be impressed on the load circuit, and a vibrating regulator for controlling the strength of said field.

10. A regulator for electrical systems including a variable speed generator, said regulator comprising a counter-electromotive force device provided with a single field and two armature windings, one connected in circuit with the field winding of said generator and the other connected in circuit to regulate the voltage to be impressed on the load circuit and a voltage controlled vibrating regulator for controlling the strength of said field.

11. A regulator for an electric circuit including a counter-electromotive force device, a field winding therefor, controlling means having an operating winding for controlling said field winding, and means for connecting said counter-electromotive force device in said circuit in series with the load and for connecting said field winding in shunt of said circuit on one side of said counter-electromotive force device and for connecting said operating winding of said controlling means in shunt of the circuit on the other side of said counter-electromotive force device.

12. A regulator for an electric circuit containing a variable speed generator for supplying current to a plurality of loads adapted to be operated at different voltages, including regulating means comprising a common field winding subject to the generator voltage and two armature windings, one for regulating the current supplied to said loads and the other for regulating the voltage impressed upon one of the loads, and a voltage responsive means for varying the effect of said field winding upon said armature windings.

13. A regulator for an electric circuit containing a variable speed generator supplying current to a plurality of loads operated at different voltages, including regulating means comprising a common field winding subject to the generator voltage and two armature windings, one for regulating the current supplied to said loads and the other for regulating the voltage impressed upon one of the loads, and a voltage responsive means subject to the voltage impresesd upon said one load for varying the effect of said field winding upon said armature windings.

14. In a regulator for an electric circuit containing a variable speed generator supplying current to a plurality of loads operated at different voltages, regulating means comprising a common field winding subject to the generator voltage and two armature windings, one of said armature windings regulating the current supplied to both loads and the other for regulating the voltage impressed upon one of the loads, and a voltage responsive vibrator for short-circuiting said field winding.

In witness whereof, I have hereunto subscribed my name in the presence of two witnesses.

WILLIAM L. BLISS.

Witnesses:
 H. H. HOPKINS,
 OSCAR O. KELLER.